(12) United States Patent
Uchikawa (10) Patent No.: US 8,009,833 B2
(45) Date of Patent: Aug. 30, 2011

(54) DATA COMMUNICATION APPARATUS, CONTROL METHOD THEREFOR, AND PROGRAM FOR IMPLEMENTING THE METHOD

(75) Inventor: Hiroshi Uchikawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 1066 days.

(21) Appl. No.: 11/204,365

(22) Filed: Aug. 15, 2005

(65) Prior Publication Data

US 2006/0034459 A1    Feb. 16, 2006

(30) Foreign Application Priority Data

Aug. 16, 2004    (JP) .................................. 2004-236599

(51) Int. Cl.
*H04L 9/00*    (2006.01)
(52) U.S. Cl. ............ 380/255; 380/28; 380/29; 713/172; 713/178
(58) Field of Classification Search .................... 380/28, 380/29, 277, 278, 279, 201; 713/172, 178; 358/508; 370/462
See application file for complete search history.

(56) References Cited

U.S. PATENT DOCUMENTS

| 5,721,777 | A  | * | 2/1998  | Blaze ............................. 380/286 |
| 6,297,892 | B1 | * | 10/2001 | Stein et al. ....................... 380/53 |
| 7,313,234 | B2 | * | 12/2007 | Takagaki et al. ................ 380/28 |
| 7,474,670 | B2 | * | 1/2009  | Nowshadi ..................... 370/462 |
| 2004/0028227 | A1 | * | 2/2004 | Yu ................................. 380/201 |

FOREIGN PATENT DOCUMENTS

JP              7-162693 A      6/1995

* cited by examiner

*Primary Examiner* — Vivek Srivastava
*Assistant Examiner* — Thong Truong
(74) *Attorney, Agent, or Firm* — Rossi, Kimms & McDowell LLP (57) ABSTRACT

A data communication apparatus which is capable of easily selecting a desired encryption scheme that is appropriate to the size of data that is to be transmitted. A key to be used for encryption is acquired. An encryption means corresponding to the acquired key is searched. The period of time required for encryption of data to be transmitted by the searched out encryption scheme is calculated. Encryption means candidates for encrypting data to be transmitted are determined based on the calculated period of time required for encryption. A user is notified of the determined encryption means candidates in a selectable manner together with the period of time required for encryption.

16 Claims, 12 Drawing Sheets

---

ENCRYPTION MEANS SELECTED:

| | |
|---|---|
| ENCRYPTION ALGORITHM | 3DES |
| KEY BIT LENGTH | 168bit |
| DATA SIZE | 2MB |
| ENCRYPTION TIME | 6sec |
| CIPHER STRENGTH | HIGH |

HIGHER CIPHER STRENGTH ENCRYPTION MEANS CANNOT BE SELECTED.
FASTER ENCRYPTION MEANS CAN BE SELECTED
BUT WILL HAVE LOWER CIPHER STRENGTH.

[ OK ]    [ RE-SELECT ]    [ CANCEL ]

| | |
|---|---|
| FIG. 4 | FIG. 4A |
| | FIG. 4B |

FIG. 4A

ENCRYPTION SELECTION TABLE (WITHOUT ACCELERATOR BOARD)

INITIAL STATE

| ID | ALGORITHM | KEY BIT LENGTH | TYPE | ENCRYPTION SPEED (MB/sec) | STATUS | KEY PRESENCE |
|---|---|---|---|---|---|---|
| 1 | DES | 56 | SOFTWARE | 0.5 | VALID | — |
| 2 | 3DES | 168 | SOFTWARE | 0.3 | VALID | — |
| 3 | DES | 56 | HARDWARE | 30 | — | — |
| 4 | 3DES | 168 | HARDWARE | 10 | — | — |
| 5 | RC4 | 128 | SOFTWARE | 0.6 | VALID | — |

AFTER ACCELERATOR BOARD DETECTION

| ID | ALGORITHM | KEY BIT LENGTH | TYPE | ENCRYPTION SPEED (MB/sec) | STATUS | KEY PRESENCE |
|---|---|---|---|---|---|---|
| 1 | DES | 56 | SOFTWARE | 0.5 | VALID | — |
| 2 | 3DES | 168 | SOFTWARE | 0.3 | VALID | — |
| 3 | DES | 56 | HARDWARE | 30 | INVALID | — |
| 4 | 3DES | 168 | HARDWARE | 10 | INVALID | — |
| 5 | RC4 | 128 | SOFTWARE | 0.6 | VALID | — |

ENCRYPTION SELECTION TABLE (WITH ACCELERATOR BOARD)

INITIAL STATE

| ID | ALGORITHM | KEY BIT LENGTH | TYPE | ENCRYPTION SPEED (MB/sec) | STATUS | KEY PRESENCE |
|----|-----------|----------------|----------|---------------------------|--------|--------------|
| 1  | DES       | 56             | SOFTWARE | 0.5                       | VALID  | —            |
| 2  | 3DES      | 168            | SOFTWARE | 0.3                       | VALID  | —            |
| 3  | DES       | 56             | HARDWARE | 30                        | —      | —            |
| 4  | 3DES      | 168            | HARDWARE | 10                        | —      | —            |
| 5  | RC4       | 128            | SOFTWARE | 0.6                       | VALID  | —            |

AFTER ACCELERATOR BOARD DETECTION

| ID | ALGORITHM | KEY BIT LENGTH | TYPE | ENCRYPTION SPEED (MB/sec) | STATUS  | KEY PRESENCE |
|----|-----------|----------------|----------|---------------------------|---------|--------------|
| 1  | DES       | 56             | SOFTWARE | 0.5                       | INVALID | —            |
| 2  | 3DES      | 168            | SOFTWARE | 0.3                       | INVALID | —            |
| 3  | DES       | 56             | HARDWARE | 30                        | VALID   | —            |
| 4  | 3DES      | 168            | HARDWARE | 10                        | VALID   | —            |
| 5  | RC4       | 128            | SOFTWARE | 0.6                       | VALID   | —            |

| FIG. 5 | FIG. 5A |
|--------|---------|
|        | FIG. 5B |

ENCRYPTION MEANS SELECTED:

| | |
|---|---|
| ENCRYPTION ALGORITHM | DES |
| KEY BIT LENGTH | 56bit |
| DATA SIZE | 4MB |
| ENCRYPTION TIME | 8sec |
| CIPHER STRENGTH | LOW |

A HIGHER CIPHER STRENGTH ENCRYPTION MEANS CAN BE SELECTED BUT WILL TAKE MORE TIME.
FASTER ENCRYPTION MEANS CANNOT BE SELECTED.

[ OK ]  [ RE-SELECT ]  [ CANCEL ]

FIG. 11

ENCRYPTION MEANS SELECTED:

| | |
|---|---|
| ENCRYPTION ALGORITHM | 3DES |
| KEY BIT LENGTH | 168bit |
| DATA SIZE | 2MB |
| ENCRYPTION TIME | 6sec |
| CIPHER STRENGTH | HIGH |

HIGHER CIPHER STRENGTH ENCRYPTION MEANS CANNOT BE SELECTED.
FASTER ENCRYPTION MEANS CAN BE SELECTED
BUT WILL HAVE LOWER CIPHER STRENGTH.

[ OK ]  [ RE-SELECT ]  [ CANCEL ]

DATA COMMUNICATION APPARATUS, CONTROL METHOD THEREFOR, AND PROGRAM FOR IMPLEMENTING THE METHOD

BACKGROUND OF THE INVENTION

1. Field of the Invention

The present invention relates to a data communication apparatus which employs a data encryption technique, a control method therefor, and a program for implementing the method.

2. Description of the Related Art

Conventionally, there has been known a technique of encrypting data and transmitting the encrypted data to thereby maintain secrecy of the data. Data communication apparatuses which employ this kind of technique generally carry out encryption and decryption using a predetermined key and a predetermined encryption algorithm (encryption scheme). In most cases, the strength (security level) of the key and the encryption algorithm that can be used are fixed for the respective data communication apparatuses, or the strength of the key and the encryption algorithm that are preset in the data communication apparatuses are used (for example, refer to Japanese Laid-Open Patent Publication (Kokai) No. H07-162693).

With such a conventional technique, therefore, time required for encryption of data increases as the size of data to be transmitted increases. During the data encryption process, processing of other functions are restricted, thus causing unfavorable effects on operation of other functions.

As measures to avoid such a problem, it can be envisaged that the encryption algorithm is automatically changed to a more simplified one, or the key strength is lowered, according to the size of data to be transmitted. However, in these cases, a problem arises that the data is transmitted by a key strength or an encryption algorithm which is not intended by the user.

SUMMARY OF THE INVENTION

It is an object of the present invention to provide a data communication apparatus and a control method therefor, which are capable of easily selecting a desired encryption scheme that is appropriate to the size of data that is to be transmitted, and a program for implementing the method.

To attain the above object, in a first aspect of the present invention, there is provided a data communication apparatus comprising an acquiring device that acquires a key to be used for encryption, a searching device that searches an encryption scheme corresponding to the key acquired by the acquiring device, a calculating device that calculates a period of time required for encryption of data to be transmitted by the encryption scheme searched out by the searching device, a determining device that determines encryption scheme candidates for encrypting data to be transmitted based on the period of time required for encryption calculated by the calculating device, and a notifying device that notifies a user of the encryption scheme candidates determined by the determining device in a selectable manner together with the period of time required for encryption.

Preferably, the acquiring device acquires a plurality of keys from a storage medium detachably attached to the data communication apparatus.

Preferably, the searching device searches the encryption scheme corresponding to the acquired key from a group of encryption schemes including encryption schemes implemented by hardware.

Also preferably, the determining device determines only encryption schemes for which the period of time required for encryption calculated by the calculating device is shorter than a predetermined period of time, as the encryption scheme candidates for encryption of the data to be transmitted.

Also preferably, the notifying device comprises a display device that displays information including the encryption scheme, the period of time required for encryption, a size of the data to be transmitted, and cipher strength of the encryption scheme.

More preferably, the display device displays at least the period of time required for encryption by one encryption scheme on one display screen and displays at least the period of time required for encryption by a next encryption scheme when no selecting operation is made on the information that is displayed.

More preferably, the display device displays at least a list of periods of time required for encryption by a plurality of encryption schemes on one display screen.

To attain the above object, in a second aspect of the present invention, there is provided a control method for controlling a data communication apparatus comprising an acquiring step of acquiring a key to be used for encryption, a searching step of searching an encryption scheme corresponding to the acquired key, a calculating step of calculating a period of time required for encryption of data to be transmitted by the searched out encryption scheme, a determining step of determining encryption scheme candidates for encrypting data to be transmitted based on the calculated period of time required for encryption, and a notifying step of notifying a user of the determined encryption scheme candidates in a selectable manner together with the period of time required for encryption.

To attain the above object, in a third aspect of the present invention, there is provided a program for causing a computer to execute a control method for controlling a data communication apparatus, comprising an acquiring module that acquires a key to be used for encryption, a searching module that searches an encryption scheme corresponding to the acquired key, a calculating module that calculates a period of time required for encryption of data to be transmitted by the searched out encryption scheme, a determining module that determines encryption scheme candidates for encrypting data to be transmitted based on the calculated period of time required for encryption, and a notifying module that notifies a user of the determined encryption scheme candidates in a selectable manner together with the periods of time required for encryption.

According to the present invention, it is possible to provide a data communication apparatus and a control method therefor, which are capable of easily selecting a desired encryption scheme that is appropriate to the size of data that is to be transmitted, and a program for implementing the method.

The above and other objects, features, and advantages of the present invention will be apparent from the following description taken in conjunction with the accompanying drawings.

DETAILED DESCRIPTION OF THE PREFERRED EMBODIMENTS

The present invention will now be described in detail below with reference to the accompanying drawings showing a preferred embodiment thereof.

Figure 1:
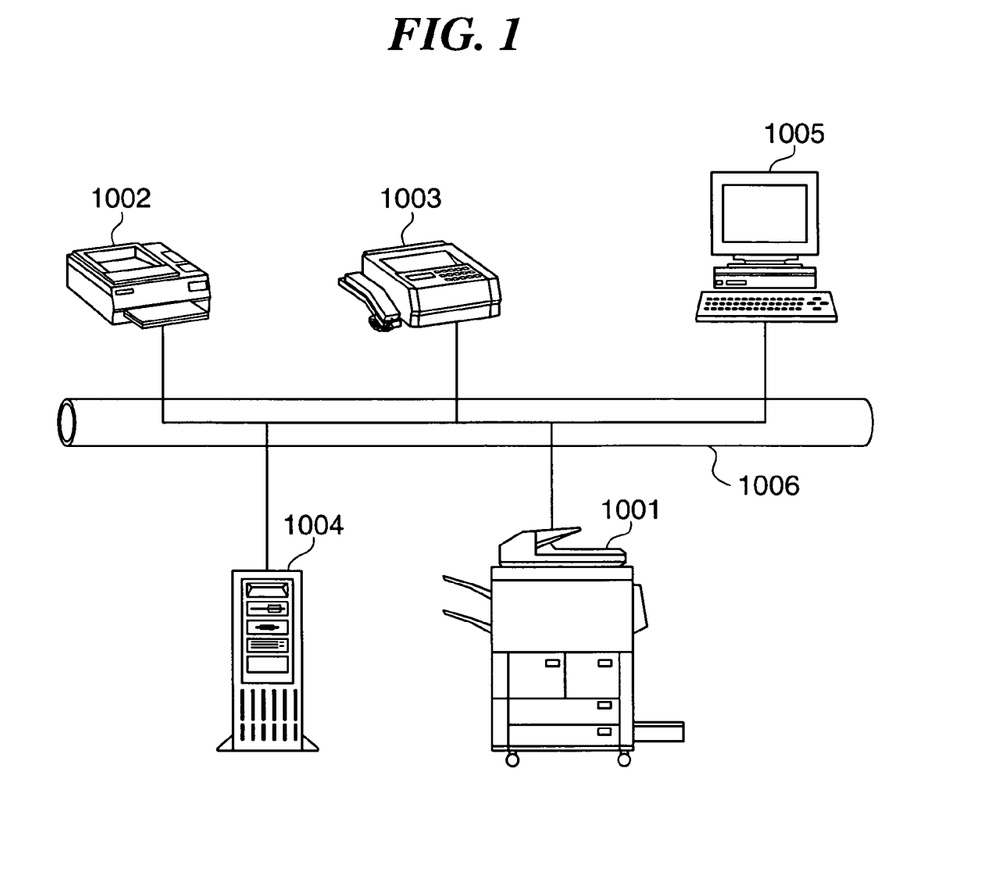
FIG. 1 is a diagram schematically showing the construction of a communication system including a data communication apparatus according to an embodiment of the present invention.

FIG. 1 is a diagram schematically showing the construction of a communication system including a data communication apparatus according to an embodiment of the present invention.

In FIG. 1, a copier 1001 as a data communication apparatus, a printer 1002, a facsimile machine 1003, a database/mail-server 1004, and a client computer 1005 are connected together via the Ethernet (registered trademark) 1006, for data communication with one another. The copier 1001, the printer 1002, the facsimile machine 1003, the database/mail-server 1004, the client computer 1005, and the Ethernet (registered trademark) 1006 constitute the communication system.

The copier 1001 has a copying function of reading and printing images of originals, as well as a function of transmitting the read image data etc., to other apparatuses. Further, the copier 1001 has a function of encrypting data that is to be transmitted and decrypting encrypted data that is received.

The printer 1002 can receive and print image data generated from information of an original read by the copier 1001, and PDL code data generated by the client computer 1005 and others. The facsimile machine 1003 can print data received from the copier 1001. The database/mail-server 1004 has application software for storing data generated by the copier 1001, and mail software for storing electronic mail received from the client computer 1005. The client computer 1005 has a function of downloading and displaying data that is stored in the database/mail-server 1004.

Figure 2:
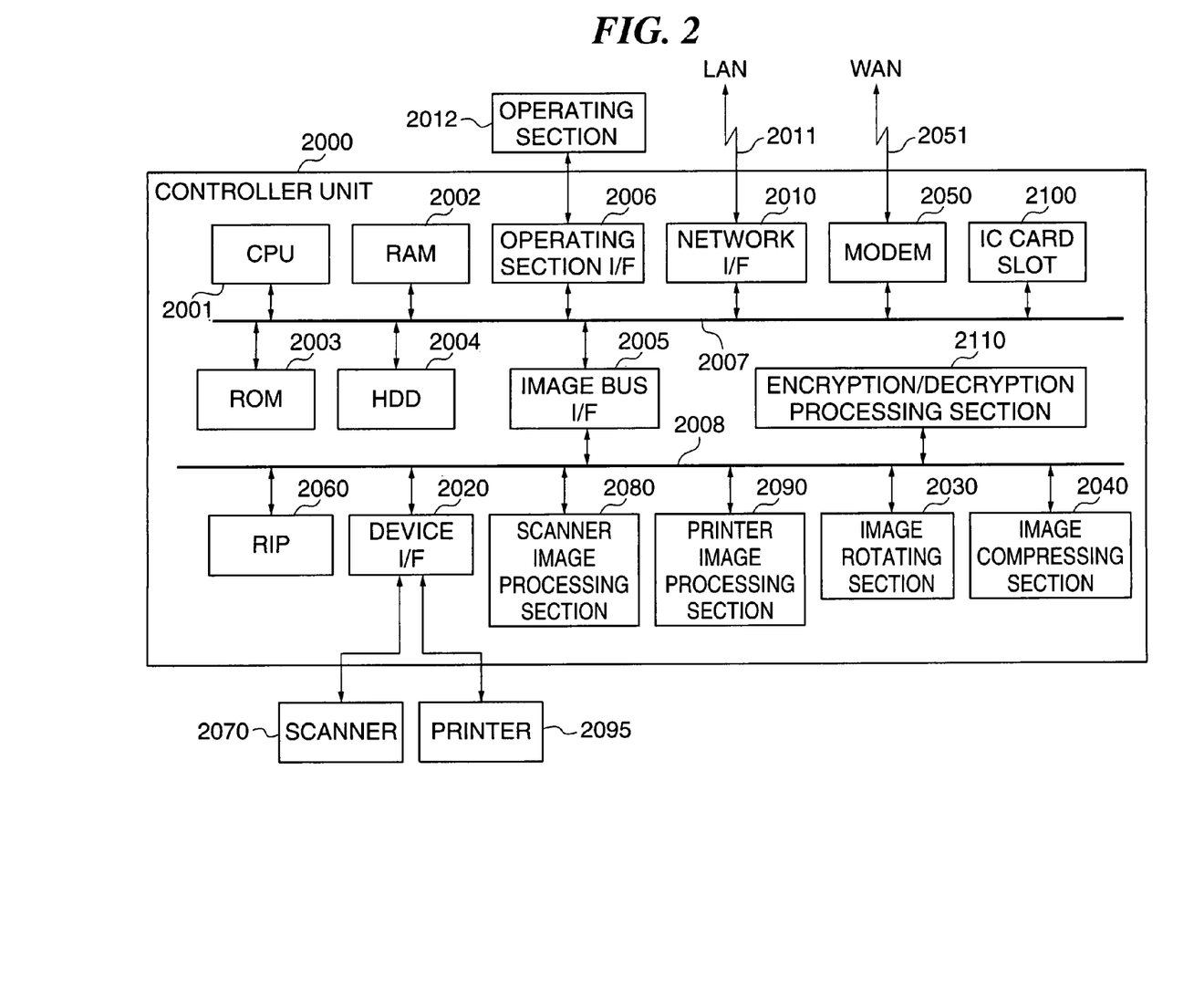
FIG. 2 is a block diagram schematically showing the construction of a copier appearing in FIG. 1.

FIG. 2 is a block diagram schematically showing the construction of the copier 1001 appearing in FIG. 1.

As shown in FIG. 2, the copier 1001 is comprised of a controller unit 2000, an operating section 2012, a scanner 2070, and a printer 2095. The controller unit 2000 is connected to the scanner 2070, the printer 2095, the operating section 2012, a LAN 2011 (corresponding to the Ethernet (registered trademark) 1006 in FIG. 1), and a public telephone line (WAN) 2051, to control input and output of image data and status information of the copier 1001 using various devices described below.

A CPU (Central Processing Unit) 2001 of the controller unit 2000 operates as a controller that controls the entire copier 1001. A RAM (Random Access Memory) 2002 is used as a work memory for the CPU 2001 to operate and also is used as an image memory for temporarily storing image data. A ROM (Read Only Memory) 2003 stores a boot program for starting the copier 1001. A HDD (Hard Disk Drive) 2004 stores system software (OS), various application software, and image data. The HDD 2004 also stores application software corresponding to processes shown in FIGS. 6 through 9.

An operating section I/F (interface) 2006 provides interface with the operating section (User Interface) 2012 which has a liquid crystal touch panel. The operating section I/F 2006 outputs image data to be displayed on the liquid crystal touch panel to the operating section 2012, and inputs key operation signals from touch keys and the like of the liquid crystal touch panel to the CPU 2001. A network I/F (interface) 2010 controls input and output of data from and to apparatuses that are connected to the LAN 2011. A modem 2050 controls input and output of data from and to apparatuses that are connected to the public telephone line 2051. An IC card, not shown, is installed in an IC card slot 2100.

In the present embodiment, as will be described later, an IC card on which key data is stored is installed in the IC card slot 2100, and the key data can be used to encrypt data that is to be transmitted. In this case, after the IC card on which key data is stored has been installed in the IC card slot 2100, by inputting an appropriate PIN (Personal Identifier Number) code, it becomes possible to carry out input and output of key data used for encryption and decryption.

The CPU 2001, the RAM 2002, the ROM 2003, the HDD 2004, the operating section I/F 2006, the network I/F 2010, the modem 2050, and the IC card slot 2100 are connected to a system bus 2007 that is connected to an image bus 2008 via an image bus I/F (interface) 2005. The image bus I/F 2005 is a bus bridge that connects the buses together, and also converts data structure. The image bus 2008 is a bus that transfers image data at high speed and is implemented by a PCI bus or an IEEE1394 bus and is connected to devices, described below.

A raster image processor (RIP) 2060 expands PDL code data inputted from the scanner 2070 and others, into bit map image data. The bit map image data is then outputted to the printer 2095 via a device I/F (interface) 2020.

The device I/F 2020 controls input and output of image data from and to the scanner 2070 and the printer 2095 while carrying out synchronous/asynchronous conversion of the image data. A scanner image processing section 2080 carries out correction, processing and editing of the inputted image data. A printer image processing section 2090 carries out processing such as correction and resolution conversion of the image data that is to be outputted to the printer 2095, according to the capability of the printer 2095. An image rotating section 2030 carries out rotation of image data. An image compressing section 2040 carries out compression of multi-valued image data into JPEG data and decompression thereof and compression of binary image data into JBIG, MMR, or MH data and decompression thereof.

An encryption/decryption processing section 2110 carries out encryption and decryption of data using the key data stored on the above-mentioned IC card. The encryption/decryption processing section 2110 can be mounted on an accelerator board.

Figure 3:
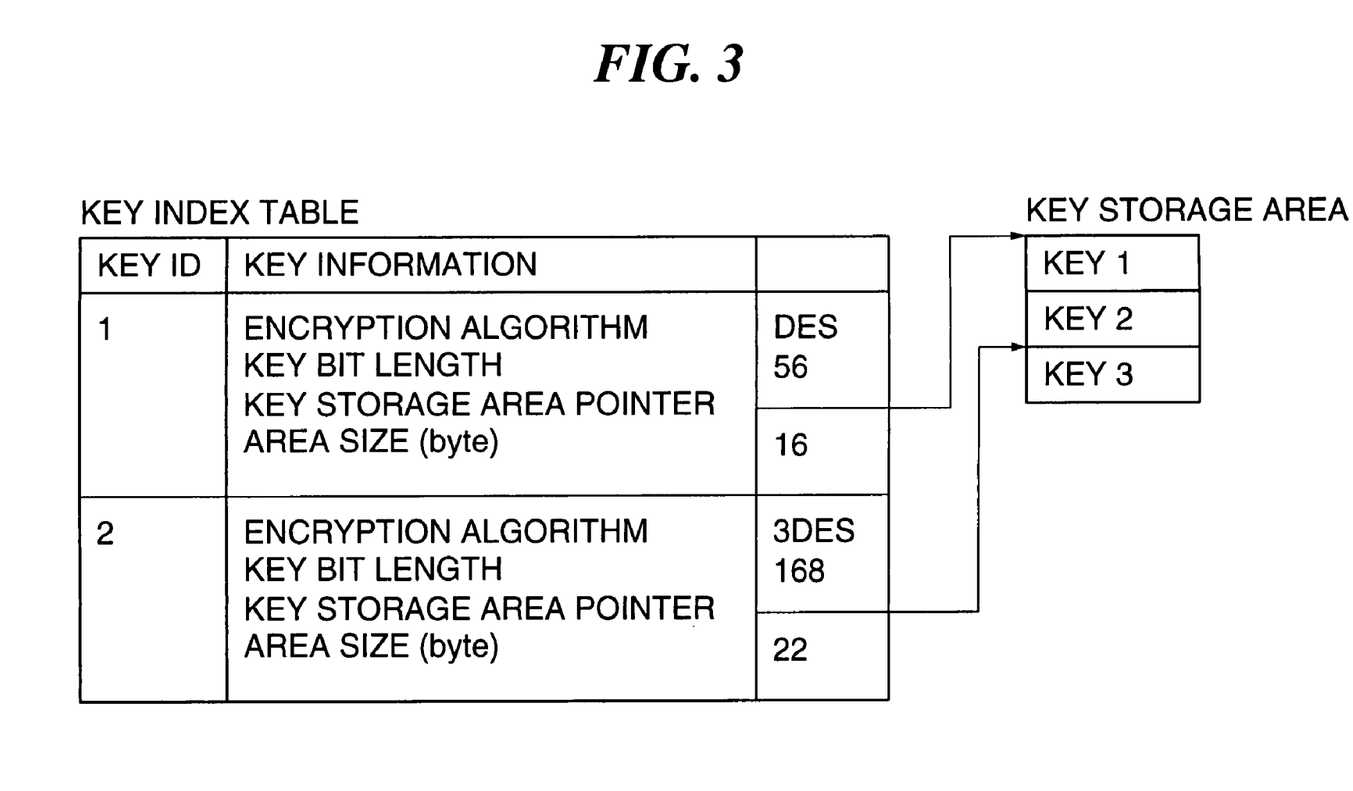
FIG. 3 is a conceptual representation of user key information stored on an IC card.

FIG. 3 is a conceptual representation of the user key information stored on the IC card.

As shown in FIG. 3, the key data is comprised of a key index table, and a key storage area. The key index table stores the following data for each key data stored: an encryption algorithm corresponding to the key data; the bit length of the key data; a pointer to the key storage area that actually stores the key data; and the size of the key storage area. The actual key data is stored in the key storage area.

Figure 4A:
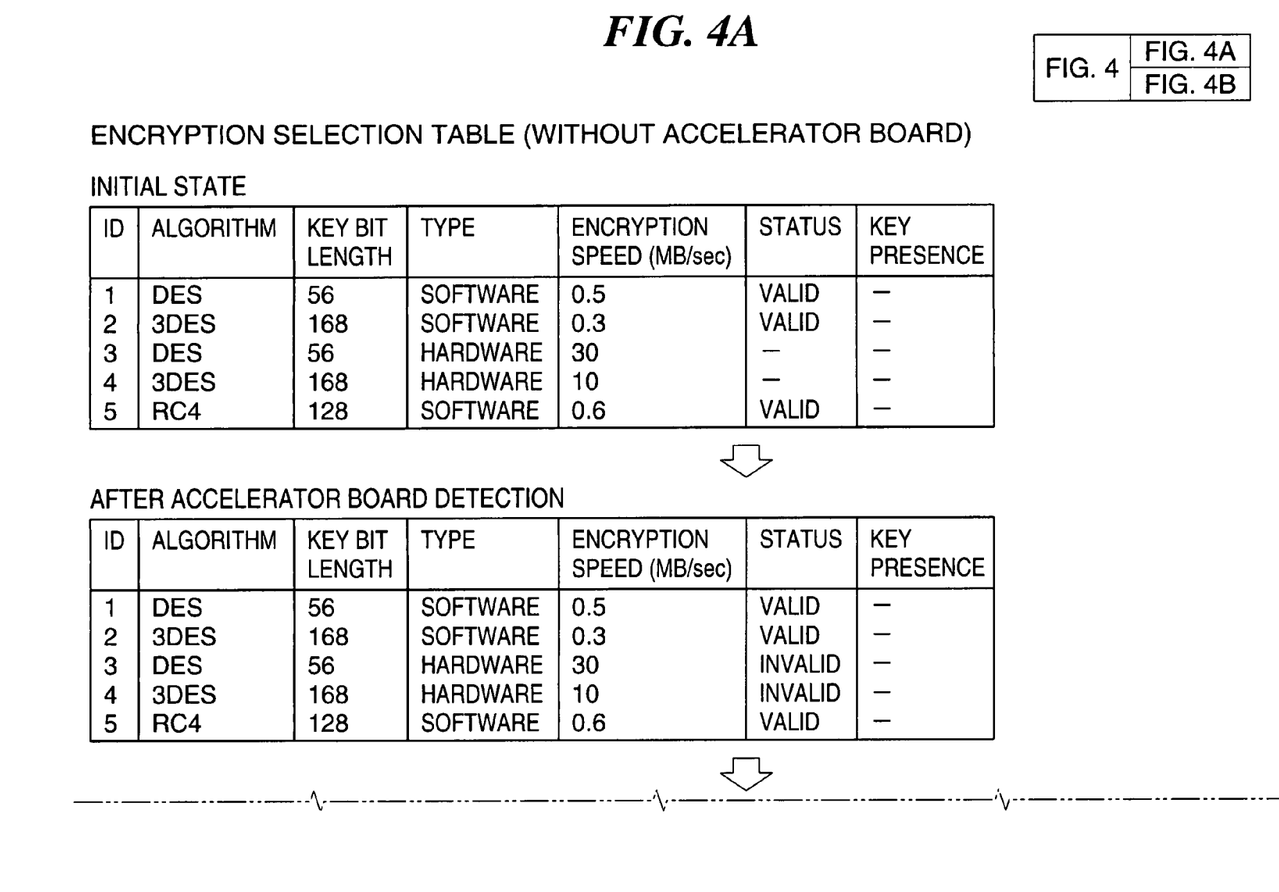
FIGS. 4A and 4B are diagrams useful in explaining how data changes in an encryption selecting table when an accelerator board is not used.
Figure 4B:
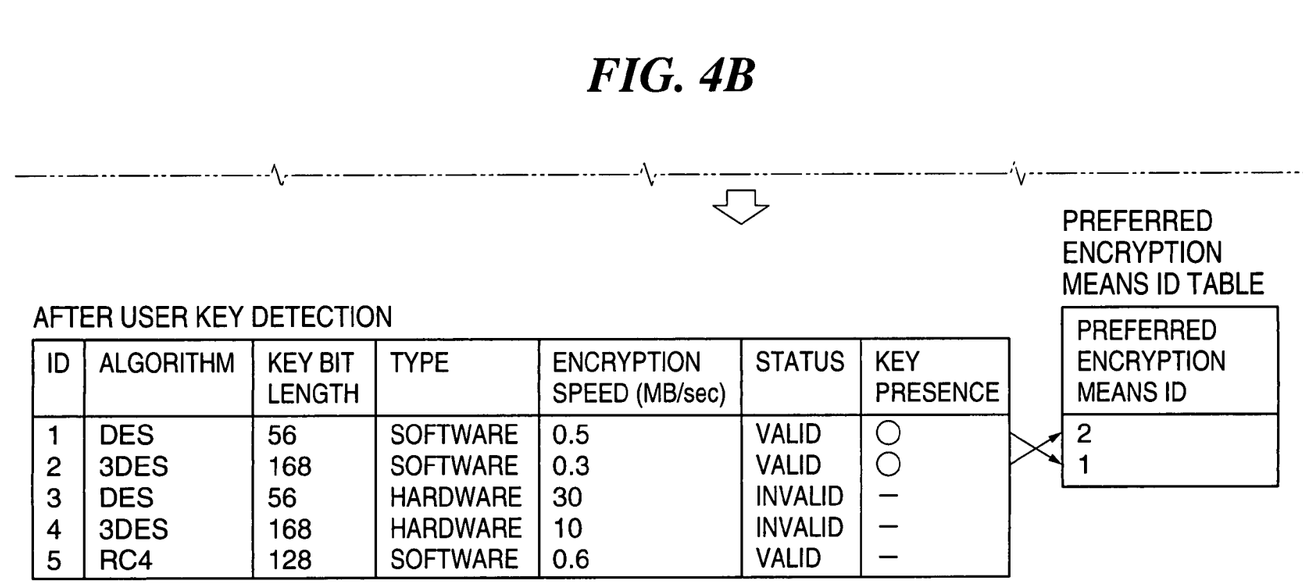

FIGS. 4A and 4B are diagrams useful in explaining how data changes in an encryption selecting table when the accelerator board is not used.

As shown in FIGS. 4A and 4B, the encryption selecting table stores data on the following: IDs of encryption means (encryption schemes); types (names) of encryption algorithm, such as DES (Data Encryption Standard), 3 DES (triple Data Encryption Standard), and RC (Revest's Cipher) 4; key bit lengths; types of hardware/software; encryption speeds; current availability statuses; and presence of a user key. The data in the encryption selecting table is caused to transit from the initial state into a state after the accelerator board is detected, by a process described later with reference to a flowchart in FIG. 6, then is caused to transit into a state after the user key is detected, by a process described later with reference to a the flowchart in FIG. 7. Thereafter, by a process described later with reference to a flowchart in FIG. 8, a preferred encryption means ID table is created, which is used to determine the encryption means.

Figure 5A:
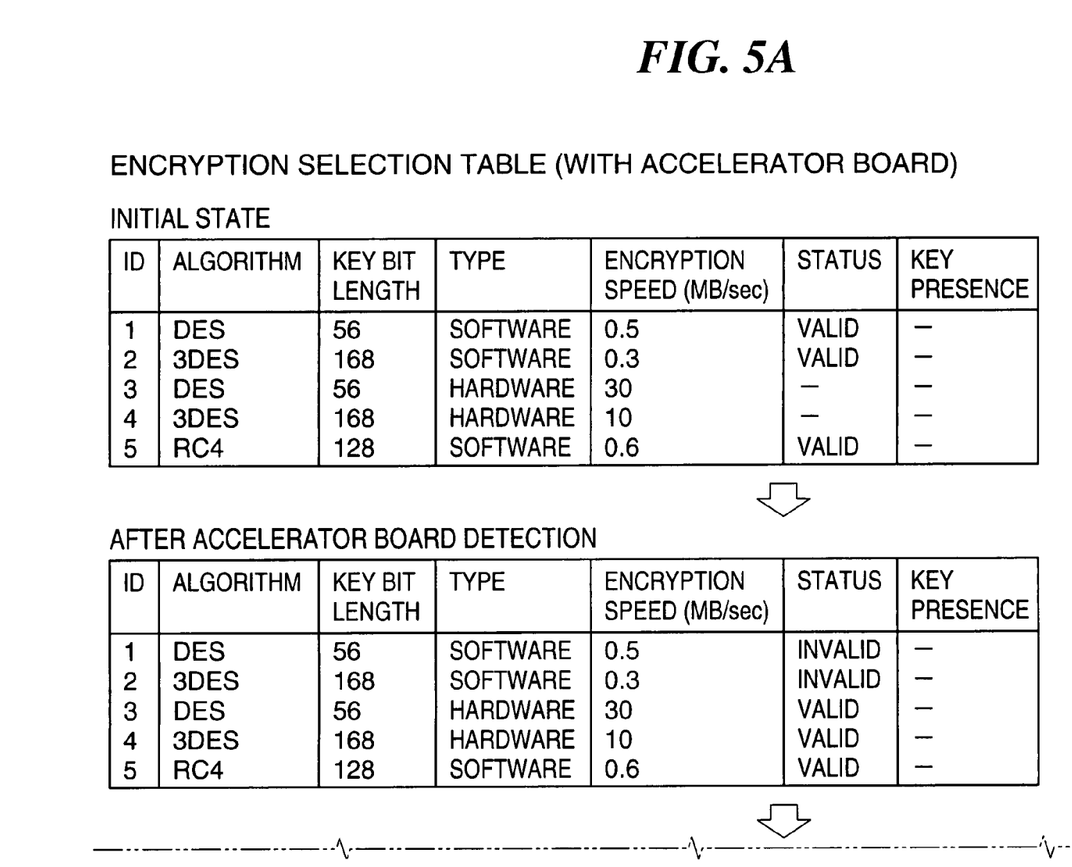
FIGS. 5A and 5B are diagrams useful in explaining how data changes in the encryption selecting table when the accelerator board is used.
Figure 5B:
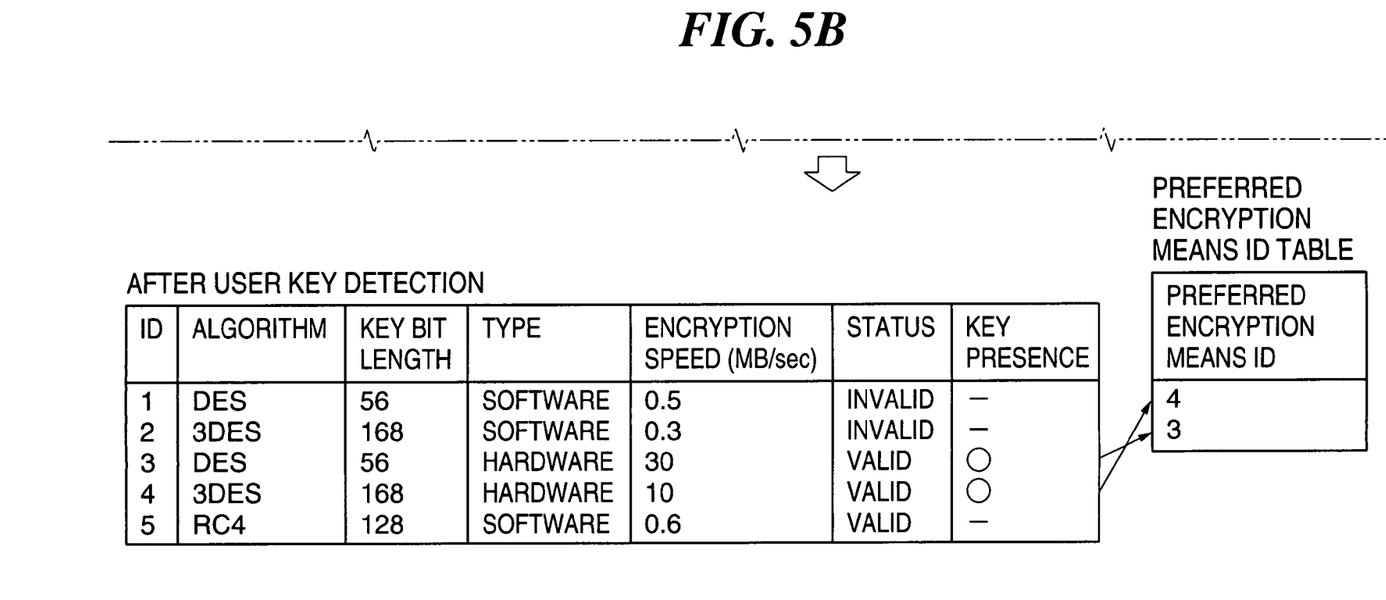

FIGS. 5A and 5B are diagrams useful in explaining how data changes in the encryption selecting table when the accelerator board is used.

As shown in FIGS. 5A and 5B, the configuration of the tables and processes of each flowchart are the same as in FIGS. 4A and 4B, however, data of the availability status and of the presence of key data, and the contents of the data of the preferred encryption means ID table differ from those of FIGS. 4A and 4B.

That is, after the accelerator board is detected, in the case of FIGS. 4A and 4B where there is no accelerator board, the data of the availability status corresponding to the encryption means IDs "3" and "4" that are mounted on the accelerator board (hardware) are indicated as "invalid". On the other hand, in the case of FIGS. 5A and 5B where there is an accelerator board, the data of the availability status corresponding to the encryption means IDs "3" and "4" that are mounted on the accelerator board (hardware) are indicated as "valid".

Further, after the user key is detected, in the case of FIGS. 4A and 4B where there is no accelerator board, the data of the key presence corresponding to the encryption means IDs "1" and "2" implemented by software, which are not mounted on the accelerator board (hardware), are indicated as "○ (present)". On the other hand, in the case of FIGS. 5A and 5B where there is an accelerator board, the data of the key presence corresponding to encryption means IDs "3" and "4", which are mounted on the accelerator board (hardware), are indicated as "○ (present)".

Further, in the preferred encryption means ID table, in the case in FIGS. 4A and 4B where there is no accelerator board, the encryption means IDs "1" and "2" implemented by software are registered. On the other hand, in the case of FIGS. 5A and 5B where there is an accelerator board, the encryption means IDs "3" and "4" implemented by hardware are registered.

Next, a process for setting the data related to the "availability status (valid/invalid)" of the encryption means in the encryption table will be described with reference to the flowchart in FIG. 6.

Figure 6:
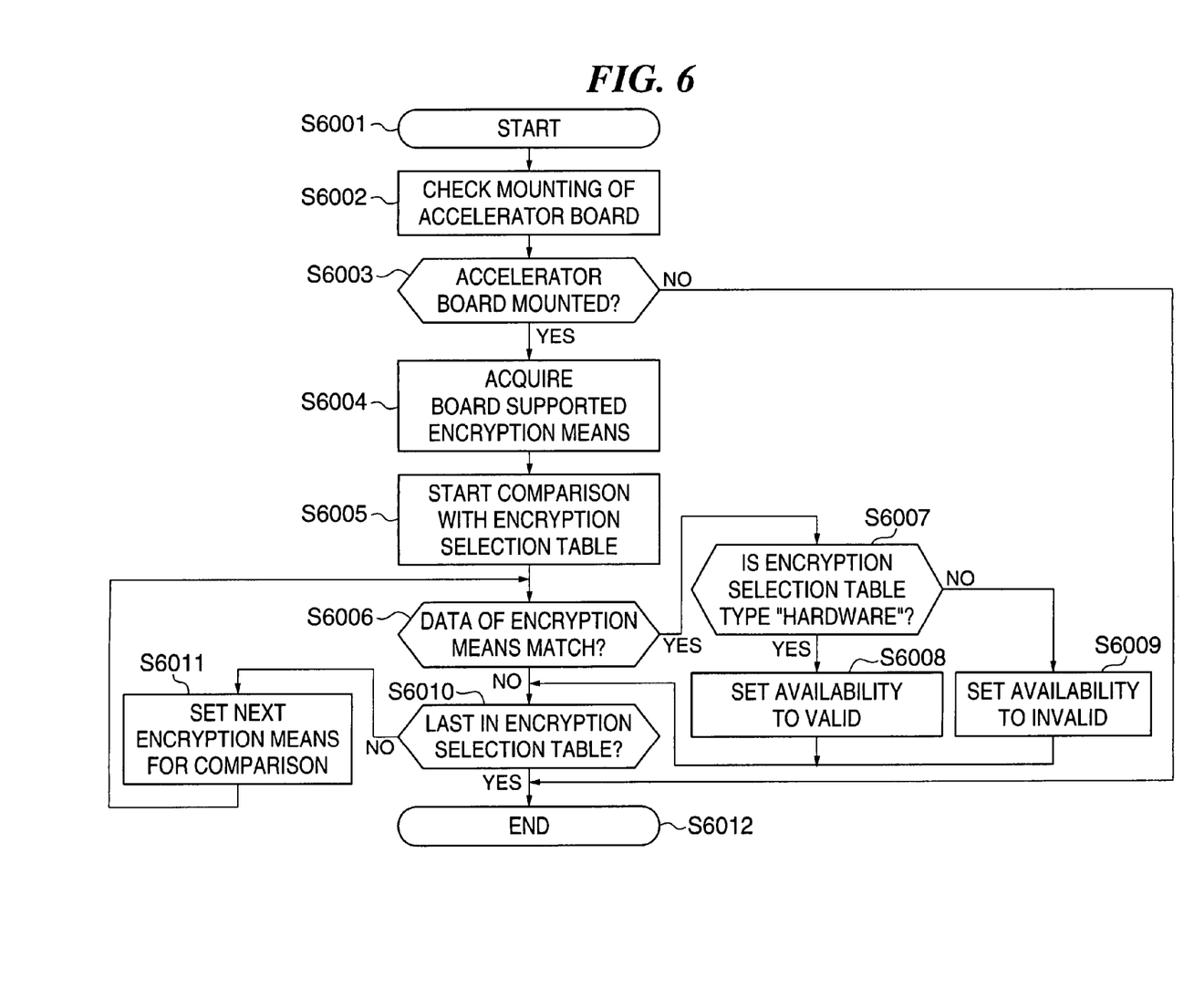
FIG. 6 is a flowchart showing a process for setting the state of availability of an encryption means in the encryption selection table.

FIG. 6 is a flowchart showing the process for setting the state of availability of the encryption means in the encryption selection table.

As shown in FIG. 6, when the copier 1001 is turned on (step S6001), the CPU 2001 carries out processing for checking mounting of the accelerator for a predetermined period of time (step S6002), and determines whether or not the accelerator board is mounted (S6003). If it is determined that the accelerator board is not mounted, the process proceeds to a step S6012 to terminate the present process. In this case, the process for setting data in the encryption selection table is not performed at all and the contents of the data in the encryption selection table remain in the initial state, as shown in FIGS. 4A, 4B, 5A and 5B.

On the other hand, if it is determined that the accelerator board is mounted, the CPU 2001 acquires data related to the encryption means that is supported by the accelerator board (step S6004). Then, to check whether or not the acquired data related to the encryption means that is supported by the accelerator board is registered in the encryption selection table, the CPU 2001 starts to compare the above acquired data with the data related to each encryption means that is registered in the encryption selecting table (step S6005). In this comparison, the data related to the encryption means having the smallest ID in the encryption selection table is compared first, and the comparison is carried out in sequence in ascending ID order.

Next, the CPU 2001 determines whether or not the data related to the encryption means (type of encryption algorithm and key bit length) in the encryption selection table which is currently being compared, matches the data related to the encryption means supported by the accelerator board (step S6006). If the data related to the both encryption means do not match, the CPU 2001 proceeds to a step S6010, described later. On the other hand, if the data related to the both encryption means match, the CPU 2001 determines whether the data type of the encryption means in the encryption selecting table that is currently being compared is "hardware" or "software" (step S6007).

If it is determined that the data type is "hardware", the "availability status" of the encryption means in the encryption selection table that is currently being compared is set to "valid" (step S6008), and the process proceeds to the step S6010. On the other hand, if it is determined that the data type is "software", the "availability status" of the encryption means in the encryption selection table that is currently being compared is set to "invalid" (step S6009), and the process proceeds to the step S6010.

In the step S6010, the CPU 2001 determines whether or not the encryption means that is currently being compared is the last encryption means listed in the encryption selection table. If it is determined that it is not the last encryption means, the CPU 2001 increments the value of a register by 1, to thereby set the next encryption means listed in the encryption selection table as the encryption means to be compared (step S6011), and then the process returns to the step S6006. On the other hand, if the encryption means is the last encryption means listed in the encryption selecting table, the CPU 2001 terminates the present process (step S6012).

According to the above process, when an encryption means exists in the encryption selecting table, whose data is the same as the data of the encryption means that is supported by the accelerator board, if the data type of the "hardware/software" of the encryption means in the encryption selecting table is "hardware", the data of the "availability status" of the same encryption means is set to "valid", whereas, if the data type of the "hardware/software" is "software", the data of the "availability status" is set to "invalid".

Figure 7:
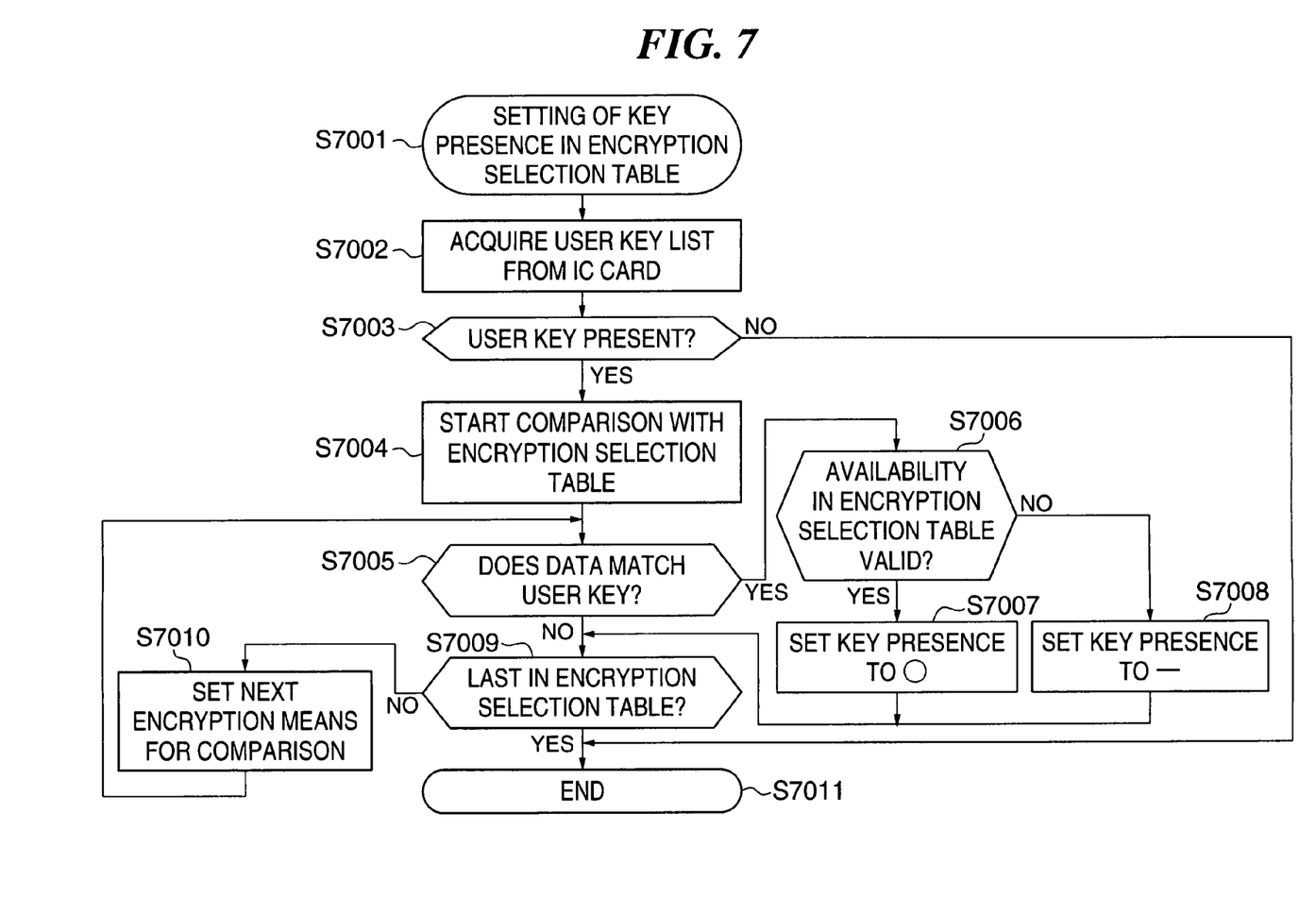
FIG. 7 is a flowchart showing a process for setting the state of presence/absence of a user key of the encryption means in the encryption selection table.

Next, a process for setting the data of "key presence" of the encryption means in the encryption selection table will be described.

FIG. 7 is a flowchart showing the process for setting the state of presence/absence of the user key of the encryption means in the encryption selection table.

As shown in FIG. 7, in a step S7001, the CPU 2001 starts the present process, and in a step S7002, acquires the user key data shown in FIG. 3, from the IC card that is installed in the IC card slot 2100 (step S7002). The CPU then determines whether or not a user key is present in the acquired data (step S7003). If it is determined that a user key is not present in the acquired data, the CPU 2001 terminates the present process.

On the other hand, if it is determined that a user key is present in the acquired data, to check whether or not the user key acquired from the IC card is registered in the encryption selection table, the CPU 2001 starts to compare the acquired user key with data related to each encryption means that is registered in the encryption selecting table (step S7004). In this comparison, the encryption means having the smallest ID in the encryption selection table is compared first, and the comparison is carried out in sequence in ascending ID order.

Next, the CPU 2001 determines whether or not the data related to the encryption means (type of encryption algorithm and key bit length) in the encryption selection table that is currently being compared, matches the user key acquired from the IC card (step S7005). If the both do not match, the CPU 2001 proceeds to a step S7009, described later. On the other hand, if the both match, the CPU 2001 determines whether the data of "availability status" of the encryption means in the encryption selecting table that is currently being compared is "valid" or not (step S7006).

If it is determined that the data of "availability status" is "valid", the data of "key presence" of the encryption means in the encryption selection table that is currently being compared is set to "present (○)" (step S7007), and the process proceed to the step S7009. On the other hand, if it is determined that the data of "availability status" is "invalid", the data of "key presence" of the encryption means in the encryption selection table that is currently being compared is set to "not present (–)" (step S7008), and the process proceeds to the step S7009.

In the step S7009, the CPU 2001 determines whether or not the encryption means that is currently being compared is the last encryption means listed in the encryption selection table. If it is determined that it is not the last encryption means, the CPU 2001 sets the next encryption means listed in the encryption selection table as the encryption means to be compared (step S7010), and then the process returns to the step S7005. On the other hand, if the encryption means is the last encryption means listed in the encryption selecting table, the CPU 2001 terminates the present process (step S7011).

According to the above process, when an encryption means exists in the encryption selecting table, whose data is the same as the data of the encryption means associated with the user key stored on the IC card, if the data of "availability status" of the encryption means in the encryption selecting table is "valid", the data of "key presence" of the same encryption means is set to "present", whereas, if the data of "availability status" is "invalid", the data of "key presence" is set to "not present".

Figure 8:
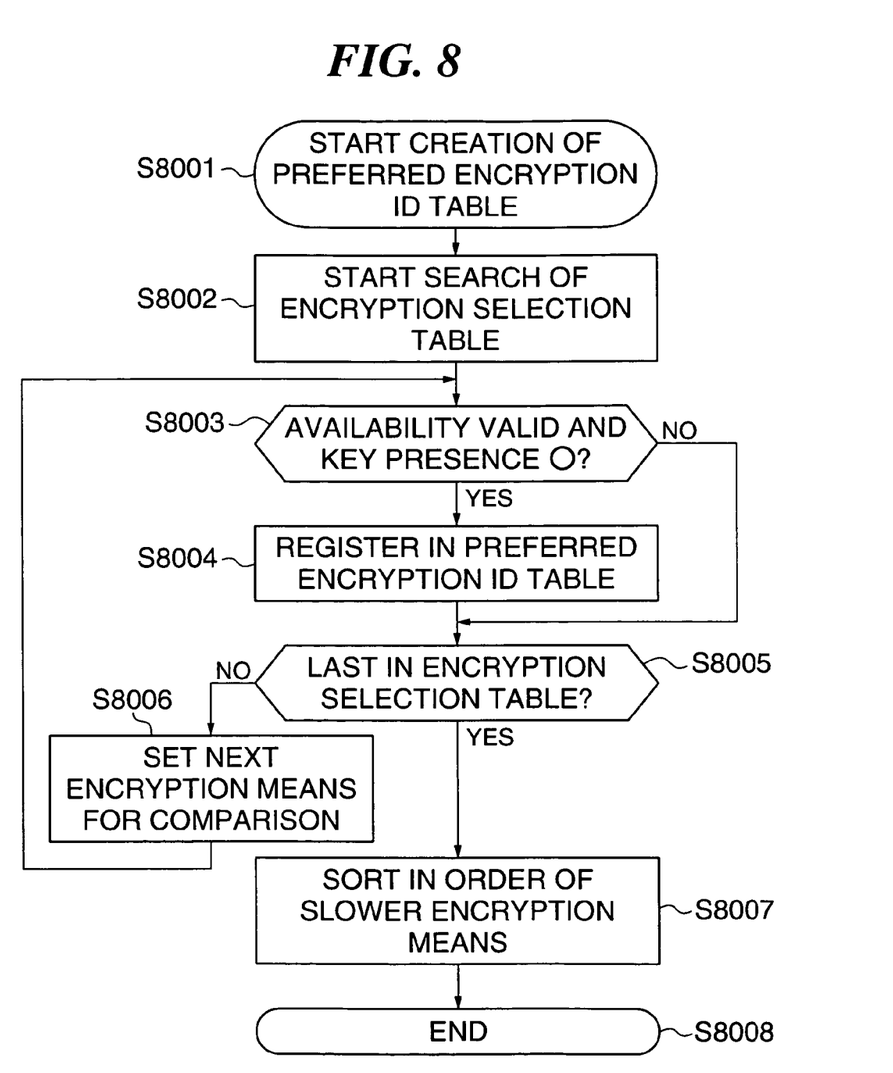
FIG. 8 is a flowchart showing a process for creating a preferred encryption means ID table from the encryption selecting table.

Next, a process for creating the preferred encryption means ID table from the encryption selection table will be described.

FIG. 8 is a flowchart showing the process for creating the preferred encryption means ID table from the encryption selecting table.

As shown in FIG. 8, in a step S8001, the CPU 2001 starts the present process and in a step S8002, carries out a search for an encryption means that is to be registered in the preferred encryption means ID table, from the encryption selection table. This search is started with the encryption means having the smallest ID, and is carried out in sequence in ascending ID order. Next, the CPU 2001 determines whether or not the availability status of the encryption means in the encryption selection table that is currently being searched is valid, and at the same time the user key presence is present (○) (step S8003).

If it is determined that the availability status is valid and at the same time the user key is present, the CPU 2001 registers the ID of the encryption means in the encryption selection table that is currently being searched in the preferred encryption means table (step S8004), and then the process proceeds to a step S8005. On the other hand, if the two conditions, that is, that the availability status is valid and that the user key is present, are not both satisfied, the process proceeds to the step S8005 without registering the ID in the step S8004.

In the step S8005, the CPU 2001 determines whether or not the encryption means that is currently being searched is the last encryption means listed in the encryption selection table. If it is determined that it is not the last encryption means, the CPU 2001 sets the next encryption means listed on the encryption selection table as the encryption means to be searched (step S8008), and then the process returns to the step S8003. On the other hand, if the encryption means is the last encryption means listed on the encryption selecting table, the CPU 2001 sorts the IDs of the encryption means in the preferred encryption means ID table in order of slower encryption speed (in order of cipher strength) (step S8007), and terminates the present process (step S8008).

According to the above process, the IDs of the encryption means in the encryption selection table, of which the availability status is valid and the user key is present, are sorted in order of slower encryption speed and are registered in the preferred encryption means ID table.

Figure 9:
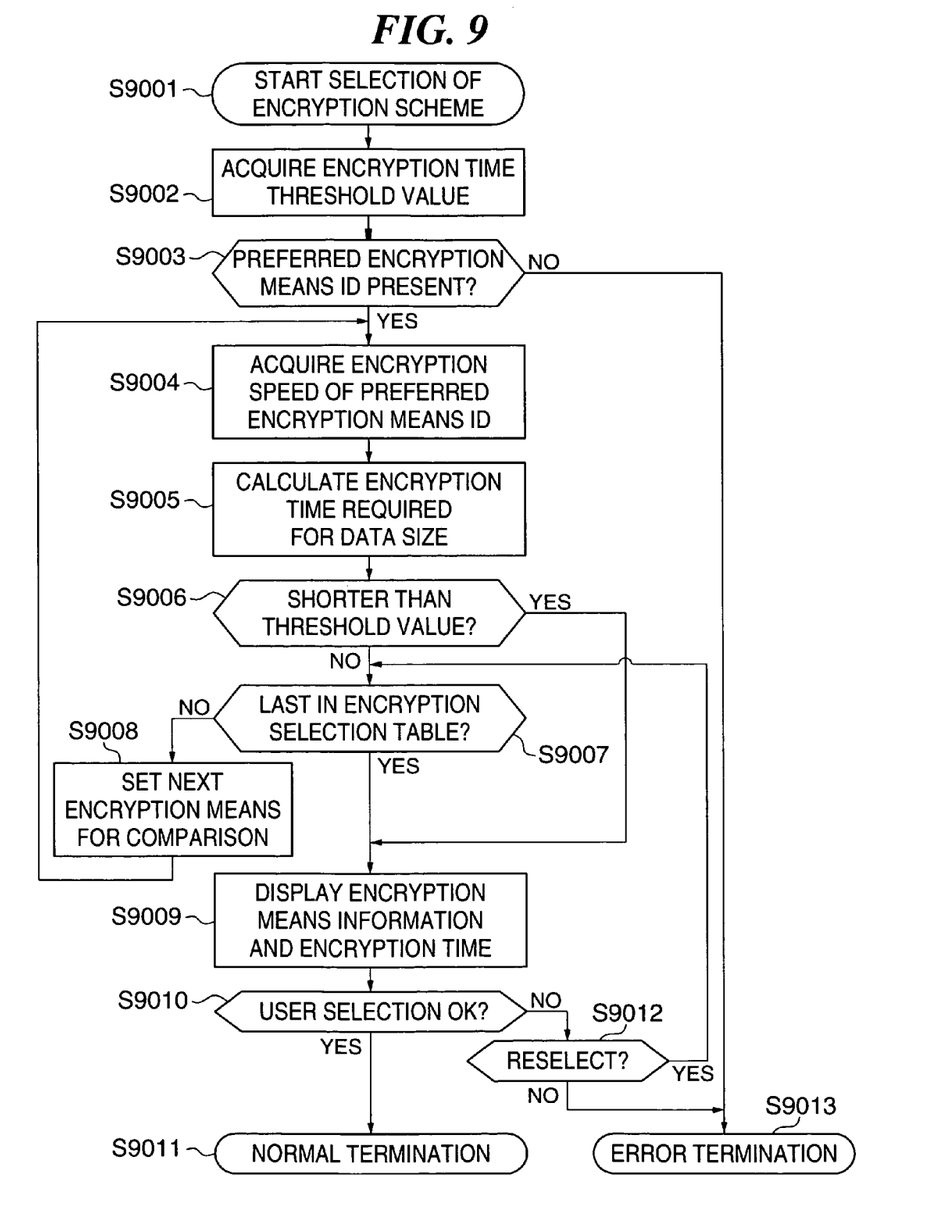
FIG. 9 is flowchart showing a process for automatically determining an appropriate encryption means according to the size of data to be transmitted and notifying the user of the encryption means.

Next, a process for automatically determining an encryption means appropriate to the size of data that is to be transmitted or encrypted, notifying the user of the determined encryption means, and prompting him/her to select the encryption means will be described.

FIG. 9 is flowchart showing a process for automatically determining an appropriate encryption means according to the size of data to be transmitted and notifying the user of the determined encryption means.

As shown in FIG. 9, in a step S9001, the CPU 2001 starts to select an encryption scheme, and in a step S9002, acquires a threshold value of a period of time required for encryption (for example, 10 seconds). In the present embodiment, the threshold value of the period of time required for encryption is preset, however, this may be set or changed by the user as desired.

Next, the CPU 2001 determines whether or not the ID of any encryption means is registered in the preferred encryption means ID table (step S9003). If it is determined that no ID is registered, the user is notified that there is no key to be used for encryption, and the process is terminated as an error has occurred (step S9013).

On the other hand, if it is determined that the ID of an encryption means is registered in the preferred encryption means ID table, the CPU 2001 acquires the encryption speed (MB/sec) of the registered encryption means from the encryption selecting table (step S9004).

Next, the CPU 2001 calculates the period of time required for encryption of the data to be transmitted by the encryption means, by dividing the size of the data to be transmitted by the encryption speed of the encryption means (MB/sec) (step S9005) The CPU 2001 then determines whether or not the calculated period of time required for encryption is shorter than the threshold value (step S9006) If the period of time required for encryption is shorter than the threshold value, information on the encryption means, such as the name and period of time required for encryption, is displayed on the liquid crystal touch panel of the operating section 2012 (step S9009).

That is, the information, such as the name and period of time required for encryption, on only the encryption means, for which the period of time required for encryption is shorter than the threshold value, will be displayed as candidates. By eliminating encryption means, for which the period of time required for encryption is longer than the threshold value, from the candidates beforehand, it is possible to prevent the user from mistakenly selecting an encryption means for which a longer period of time is required for encryption than a predetermined time, and thus practically avoids limitations on execution of processing related to functions other than the encryption process.

Figure 10:
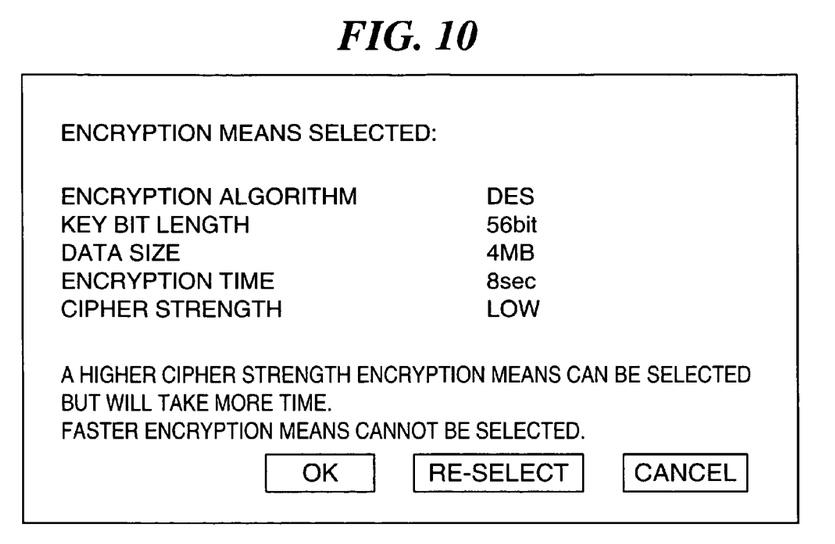
FIG. 10 is a view showing an example of a display screen displayed in a step S9009 in FIG. 9.
Figure 11:
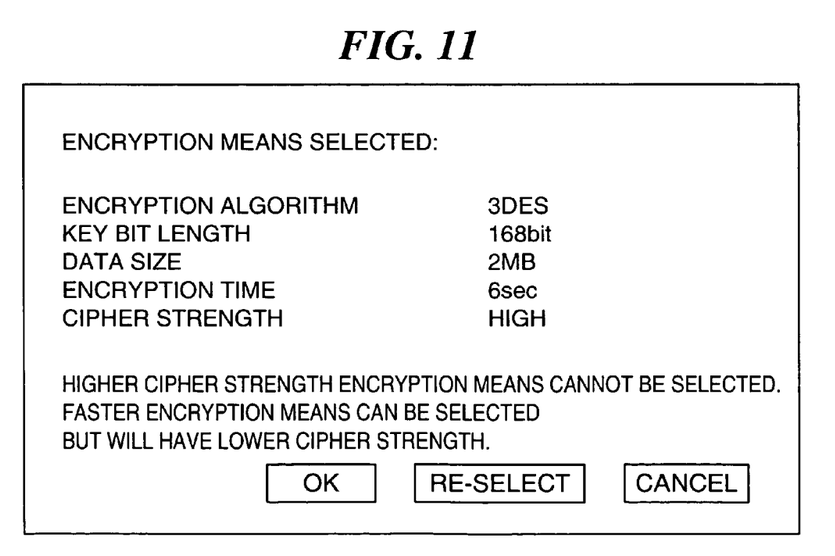
FIG. 11 is a view showing another example of the display screen displayed in the step S9009 in FIG. 9.

In the step S9009, an OK button, a re-selection button, and a cancel button are displayed together with the information on the encryption means, such as the name of the encryption means and the period of time required for encryption (refer to FIGS. 10 and 11).

Next, if the OK button is pressed (YES to a step S9010), the CPU 2001 selects (fixes) the encryption means that is being displayed as the encryption means to be used for encryption of the data to be transmitted, and the process is terminated normally (step S9011). If the OK button is not pressed (NO to the step S9010) and the re-select button is pressed (YES to a step S9012), the process returns to a step S9007, referred to later, and if the re-select button is not pressed, the process is terminated as an error has occurred.

Referring again to the step S9006, if it is determined that the period of time required for encryption is longer than the threshold value (NO to the step S9006), the CPU 2001 determines whether or not the encryption means for which the period of time required for encryption has been calculated is an encryption mean having the last ID in the preferred encryption means ID table (step S9007). If it is not the last encryption means, the encryption means having an ID listed next on the preferred encryption means ID table is set as the encryption means to be processed (step S9008), and the process returns to the step S9004. On the other hand, if the encryption means has the last ID listed on the preferred encryption means ID table, the process proceeds to the step S9009.

FIG. 10 and FIG. 11 are views showing examples of the display screen displayed in the step S9009 in FIG. 9. FIG. 10 and FIG. 11 show examples in which the accelerator board is not used and the threshold time is set to 10 seconds.

As shown in the example in FIG. 10, when the size of the data that is to be transmitted is 4 MB, which is substantially large, the DES, which has a relatively high encryption speed but a relatively low cipher strength, is displayed as a selection candidate for the encryption means. Also displayed are: the name of the encryption algorithm; the key bit length; the size of the data to be transmitted; the period of time required for encryption; and the cipher strength, together with a guidance message notifying the user that it is possible to select another encryption means having a higher cipher strength than the displayed encryption means but that it is not possible to select an encryption means having an encryption time shorter than the displayed encryption means.

FIG. 11 is a view showing another example of the display screen displayed in the step S9009 in FIG. 9.

As shown in the example in FIG. 11, when the size of the data that is to be transmitted is 2 MB, which is substantially small, the 3DES, which has a relatively slow encryption speed but a relatively high cipher strength, is displayed as a selection candidate for the encryption means. Also displayed are: the name of the encryption algorithm; the key bit length; the size of the data that is to be transmitted; the time required for encryption; and the cipher strength, together with a guidance message notifying the user that it is not possible to select another encryption means having a higher cipher strength than the displayed encryption means but that it is possible to select an encryption means having an encryption time shorter than the displayed encryption means.

As described above, according to the present embodiment, a key to be used for encryption is acquired from the IC card, and an encryption means corresponding to the key is searched from the encryption selection table. The IDs of the searched out encryption means are registered on the preferred encryption means table in the order of slower encryption speed. The time required for encryption of the data to be transmitted by an encryption means with its registered ID is calculated. Based on the result of the calculation, only when the period of time required for encryption is shorter than a predetermined period of time, the encryption means is determined as a candidate for the encryption means to be used for encryption of the data that is to be transmitted. The determined encryption means is displayed together with the period of time required for encryption in a manner being selectable by the OK button and the RESELECT button. As a result, it is possible to easily select a desired encryption means appropriate to the size of the data that is to be transmitted. Further, it is possible to practically avoid limitations on execution of processing related to functions other than the encryption process.

The present invention is not limited to the above described embodiment, but certain changes and modifications may be possible within the scope of the appended claims insofar as functions recited in the appended claims or the functions of the above described embodiment can be achieved. For example, the period of time required for encryption may be calculated in a batch for a plurality of encryption means registered in the preferred encryption means ID table, and encryption means for which the period of time required for encryption is shorter than the threshold value may be displayed in a list in a selectable manner, together with various information on the encryption means. Further, although in the above described embodiment, the present invention is applied to a copier as an example of the data communication apparatus, this is not limitative, but the data communication apparatus may be a printer, a scanner, a facsimile, or a multi-function machine.

Further, it is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, CD-RW, DVD-ROM, DVD-RAM, DVD-RW, and DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code. If the above storage medium is applied to the present invention, the program code of the above described flowcharts (of FIGS. 6 to 9) will be stored.

CROSS REFERENCE TO RELATED APPLICATION

This application claims priority from Japanese Patent Application No. 2004-236599 filed Aug. 16, 2004, which is hereby incorporated by reference herein.

What is claimed is:

1. A data communication apparatus comprising:
   an acquiring device that acquires a key to be used for encryption;
   a searching device that searches at least one encryption scheme corresponding to the key acquired by said acquiring device;
   a setting device that sets a threshold value of a period of time required for the encryption;
   a calculating device that calculates, based on a data size of a scanned image file to be transmitted, a period of time required for encryption of the scanned image file to be transmitted, the encryption of the scanned image file being performed by the encryption scheme searched out by said searching device;
   a first determining device that determines whether or not the period of time calculated by said calculating device is shorter than the threshold value set by said setting device;
   a display device that displays the encryption scheme together with the period of time required for encryption of the scanned image file as a selectable candidate when the period of time calculated by said calculating device is determined to be shorter than the threshold value;
   a second determining device that determines the encryption scheme as the encryption scheme for encryption of the scanned image file to be transmitted when the selectable candidate is selected by a user; and
   a transmission device that transmits the image file encrypted by the determined encryption scheme to the outside of the data communication apparatus, by using the key acquired by the acquiring device,
   wherein the data communication apparatus is a copier, a printer, a scanner, a facsimile machine, or a multi-function machine that performs at least two functions selected from the group consisting of copying, printing, scanning, and faxing.

2. The data communication apparatus as claimed in claim 1, wherein said acquiring device acquires a plurality of keys from a storage medium detachably attached to the data communication apparatus.

3. The data communication apparatus as claimed in claim 1, wherein said searching device searches the encryption scheme corresponding to the acquired key from a group of encryption schemes including encryption schemes implemented by hardware.

4. The data communication apparatus as claimed in claim 1, wherein said display device displays information including the encryption scheme, the period of time required for encryption, a size of the scanned image file, and cipher strength of the encryption scheme.

5. The data communication apparatus as claimed in claim 1, wherein said display device displays at least the period of time required for encryption by one encryption scheme on one display screen and displays at least the period of time required for encryption by a next encryption scheme when no selecting operation is made on the information that is displayed.

6. The data communication apparatus as claimed in claim 1, wherein said display device displays at least a list of periods of time required for encryption by a plurality of encryption schemes on one display screen.

7. A data communication method executed by a data communication apparatus, the method comprising:
   acquiring a key to be used for encryption with an acquiring device;
   searching at least one encryption scheme corresponding to the key acquired by said acquiring device with a searching device;
   setting a threshold value of a period of time required for the encryption with a setting device;
   calculating, based on a data size of a scanned image file to be transmitted, a period of time required for encryption of the scanned image file to be transmitted, the encryption of the scanned image file being performed by the encryption scheme searched out by said searching device with a calculating device;
   determining whether or not the period of time calculated by said calculating device is shorter than the threshold value set by said setting device;
   displaying the encryption scheme together with the period of time required for encryption of the scanned image file as a selectable candidate on a display device when the period of time calculated by said calculating device is determined to be shorter than the threshold value;
   determining the encryption scheme as the encryption scheme for encryption of the scanned image file when the selectable candidate is selected by a user; and
   transmitting the image file encrypted by the determined encryption scheme to the outside of the data communication apparatus, by using the key acquired by the acquiring device,
   wherein the data communication apparatus is a copier, a printer, a scanner, a facsimile machine, or a multi-function machine that performs at least two functions selected from the group consisting of copying, printing, scanning, and faxing.

8. The data communication method as claimed in claim 7, wherein said a plurality of keys are acquitted from a storage medium.

9. The data communication method as claimed in claim 7, wherein said the encryption scheme corresponding to the acquired key is searched from a group of encryption schemes including encryption schemes implemented by hardware.

10. The data communication method as claimed in claim 7, wherein information including the encryption scheme, the period of time required for encryption, a size of the data to be transmitted, and cipher strength of the encryption scheme is displayed on the display device.

11. The data communication method as claimed in claim 7, wherein at least a list of periods of time required for encryption by a plurality of encryption schemes are displayed on the display device.

12. A non-transitory computer readable storage medium encoded with a computer program, that when executed by a computer in a data communication apparatus causes the data communication apparatus to perform a data communication method, the data communication method comprising:
   acquiring a key to be used for encryption with an acquiring device;
   searching at least one encryption scheme corresponding to the key acquired by said acquiring device with a searching device;
   setting a threshold value of a period of time required for the encryption with a setting device;
   calculating, based on a data size of a scanned image file to be transmitted, a period of time required for encryption of the scanned image file to be transmitted, the encryption of the scanned image file being performed by the encryption scheme searched out by said searching device with a calculating device;
   determining whether or not the period of time calculated by said calculating device is shorter than the threshold value set by said setting device;
   displaying the encryption scheme together with the period of time required for encryption of the scanned image file as a selectable candidate on a display device when the period of time calculated by said calculating device is determined to be shorter than the threshold value; and
   determining the encryption scheme as the encryption scheme for encryption of scanned image file to be transmitted when the selectable candidate is selected by a user,
   wherein the data communication apparatus is a copier, a printer, a scanner, a facsimile machine, or a multi-function machine that performs at least two functions selected from the group consisting of copying, printing, scanning, and faxing.

13. The computer readable storage medium as claimed in claim 12, wherein said a plurality of keys are acquitted from a storage medium.

14. The computer readable storage medium as claimed in claim 12, wherein said the encryption scheme corresponding to the acquired key is searched from a group of encryption schemes including encryption schemes implemented by hardware.

15. The computer readable storage medium as claimed in claim 12, wherein information including the encryption scheme, the period of time required for encryption, a size of the scanned image file to be transmitted, and cipher strength of the encryption scheme is displayed on the display device.

16. The computer readable storage medium as claimed in claim 12, wherein at least a list of periods of time required for encryption by a plurality of encryption schemes are displayed on the display device.

* * * * *